United States Patent [19]

Wilk et al.

[11] Patent Number: 4,474,941

[45] Date of Patent: Oct. 2, 1984

[54] ALKYD RESINS CONTAINING FUNCTIONAL EPOXIDES

[75] Inventors: Hans-Christoph Wilk, Neuss; Alfred Meffert, Monheim; Bernd Wegemund, Haan, all of Fed. Rep. of Germany

[73] Assignee: Henkel Kommanditgesellschaft auf Aktien, Duesseldorf, Fed. Rep. of Germany

[21] Appl. No.: 561,626

[22] Filed: Dec. 15, 1983

[30] Foreign Application Priority Data

Dec. 16, 1982 [DE] Fed. Rep. of Germany ....... 3246615
Jul. 22, 1983 [EP] European Pat. Off. ........ 83107211.1

[51] Int. Cl.$^3$ ............................................. C08G 63/54
[52] U.S. Cl. .................................. 528/295.3; 524/601; 528/295.5; 528/296; 528/297
[58] Field of Search .................. 528/295.3, 295.5, 296, 528/297

[56] References Cited

U.S. PATENT DOCUMENTS

| | | | |
|---|---|---|---|
| 4,031,047 | 6/1977 | Dhein et al. | 528/295.5 X |
| 4,042,547 | 8/1977 | Kaiser et al. | 528/295.5 |
| 4,049,599 | 9/1977 | Lott | 528/295.3 X |
| 4,125,521 | 11/1978 | Murakami et al. | 528/274 |
| 4,179,420 | 12/1979 | Laganis | 528/296 X |
| 4,200,560 | 4/1980 | Kubo et al. | 528/297 X |
| 4,220,568 | 9/1980 | Patzsche | 528/295.3 |
| 4,248,745 | 2/1981 | Laganis | 528/296 X |
| 4,333,865 | 6/1982 | Zückert | 528/297 X |
| 4,390,688 | 6/1983 | Walz et al. | 528/296 X |

*Primary Examiner*—Lucille M. Phynes
*Attorney, Agent, or Firm*—Ernest G. Szoke; Henry E. Millson, Jr.; Mark A. Greenfield

[57] ABSTRACT

Alkyd resins containing functional epoxides as long-chain modifying agents. The functional epoxides used are selected from the following:

(a) epoxidized unsaturated fatty alcohols containing from 16 to 22 C-atoms,
(b) esters of epoxidized fatty acids and monofunctional alcohols containing from 1 to 18 C-atoms,
(c) epoxidized triglycerides,
(d) reaction products of epoxidized triglycerides containing in the molecule epoxide groups and secondary hydroxyl groups formed by ring opening.

The alkyd resins according to the invention are distinguished by particularly good weathering properties.

13 Claims, No Drawings

ALKYD RESINS CONTAINING FUNCTIONAL EPOXIDES

BACKGROUND OF THE INVENTION

This invention relates to alkyd resins and further relates to so-called oil-free alkyd resins which are understood to be resins which are modified with long-chain epoxides incorporated through the polybasic carboxylic acid components. More particularly, the present invention relates to oil-free alkyd resins for use in lacquers, particularly water lacquers.

It is well known that fatty acids in alkyd resins can be replaced by long-chain epoxides which are incorporated through the polybasic carboxylic acid component. Thus, U.S. Pat. No. 4,125,521 describes alkyd resins which contain as their characteristic constituent long-chain epoxy alkanes containing an internal epoxide group. These resins are suitable for use in solvent lacquers, but not in water lacquers. The claimed advantage is the increase in resistance to hydrolysis.

Oil-free alkyd resins are known in the field of water lacquers. Thus, U.S. Pat. No. 4,200,560 describes resins having an acid number of from 25 to 80 and an —OH number of up to about 180 mg of KOH/g. The claimed advantages include better weather resistance and less yellowing.

However, the usefulness of these resins is limited by the fact that it is possible to obtain films of only moderate hardness from the water lacquers thus produced. Despite their favorable weathering behavior, resins of this type are unsuitable for many external applications, including for example finish-lacquering in the automotive industry.

There is still a need for resins for water lacquers having as low an acid number as possible (for example <35 or <25 mg of KOH/g) because resins such as these require smaller quantities of amine for neutralization. With acid numbers as low as these, however, the resins described hitherto cannot be made up into homogeneous, clear aqueous preparations.

Accordingly, there is need to provide alkyd resins which can be stoved to form hard and flexible lacquers and which show excellent weathering behavior, particularly with respect to high resistance to water in the condensed-moisture test.

DESCRIPTION OF THE INVENTION

Accordingly, an object of the present invention is to provide alkyd resins based on oleochemical (renewable) starting materials which can be processed into lacquer films having improved weathering properties and, in particular, improved resistance to condensed moisture and extreme hardness. A further object of the invention is to provide alkyd resins having the above-mentioned properties for use in water lacquers. More particularly, an object of the invention is to provide alkyd resins having an acid number of from about 5 to about 30 mg of KOH/g which can be made up into water lacquers without the use of troublesome auxiliary components (such as volatile organic solvents, volatile amines or emulsifiers unaffected by stoving), and which after stoving give lacquer films combining improved resistance to condensed moisture with extreme hardness.

Accordingly, the present invention relates to alkyd resins produced by the condensation of polybasic carboxylic acids and/or their reactive derivatives with polyhydroxy compounds, optionally in the presence of a monofunctional modifying agent such as a monocarboxylic acid, wherein at least one of the following epoxides is co-condensed therewith as a long-chain alkyd resin modifying reaction component:
(a) epoxidized unsaturated fatty alcohols containing from 16 to 22 C-atoms;
(b) esters of epoxidized fatty acids and monofunctional alcohols containing from 1 to 18 C-atoms;
(c) epoxidized triglycerides; and
(d) reaction products of epoxidized triglycerides containing in the molecule epoxide groups and secondary hydroxyl groups formed by ring opening.

These long-chain alkyd resin modifying reaction components differ from the long-chain olefin oxides of the prior art in the fact that they contain an additional functional group in the molecule, namely, a hydroxyl group or an ester group. Although the chemical laws on which the present invention is based are not fully known, it is assumed that enhanced incorporation of the long-chain modifying component is obtained through this additional functional group either by esterification or by transesterification, resulting in the improved properties observed, particularly the greater hardness. Preferably, from about 5 to 50% by weight, more preferably from about 10 to about 30% by weight, based on the weight of alkyd resin, of the long-chain alkyd resin modifying reaction component is present in the resin.

In a first embodiment, the invention relates to alkyd resins containing epoxidized $C_{16}$–$C_{22}$ fatty alcohols as the long-chain modifying component. Fatty alcohols are mixtures of primary, monofunctional, straight-chain alcohols. They are obtained by reducing the esters of naturally occurring fatty acids with the double bond intact. The position and number of double bonds and hence of the epoxide groups are thus determined by the type of natural fat on which the fatty alcohol is based. Preferred epoxidized fatty alcohols are those which are rich in epoxidized oleyl alcohol and and which can be produced for example from fatty alcohol mixtures having iodine numbers of from 90 to 95. On the other hand, however, epoxidized fatty alcohols produced from fatty alcohols containing a high percentage of linolyl or linolenyl alcohol are also very useful herein. Another preferred epoxidized fatty alcohol is epoxidized erucic alcohol.

The conversion of the fatty alcohols into the corresponding epoxides can be carried out with a conversion of from a few mole percent to almost 100%. Preferred modifying components for alkyd resins are fatty alcohols which have been epoxidized to the greatest extent possible. Epoxidation itself is carried out in a known manner and is not the subject of the present invention.

In another embodiment of the invention, epoxidized esters of unsaturated fatty acids with monofunctional alcohols (alkanols or alkenols) containing from 1 to 18 C-atoms are used as the long-chain alkyd resin modifying reaction component. The ester group in these modifying agents is a second reactive group which can be incorporated in the resin by transesterification during the condensation reaction. Epoxidized fatty acid esters of lower monofunctional alkanols, such as methyl or ethyl esters, are preferred. In some cases, however, it is desired to add fatty alcohols during the production of the alkyd resins. Hence, esters of epoxidized fatty acids with long-chain alcohols, such as fatty alcohol cuts, are also of importance. The fatty acid residue of the epoxidized fatty acid esters is preferably derived from a $C_{16}$-$C_{22}$ unsaturated fatty and, especially oleic acid, linoleic acid, linolenic acid or erucic acid. In any event, it is preferred to use commercially obtainable mixtures prepurified by distillation. In this case, preferred long-chain alkyd resin modifying reaction components are epoxystearic acid methyl ester or epoxidized erucic acid methyl ester.

The present invention also relates to alkyd resins containing epoxidized triglycerides as the long-chain modifying component. It is known that triglycerides containing less than one to more than three double bonds per molecule of triglyceride occur in nature. A wide range of potential alkyd resin modifying agents containing from one to more than three epoxide groups can be produced from these starting materials by subjecting them to partial or almost complete epoxidation. Thus, epoxidized triglycerides can be produced, for example, from tallow oil, sunflower oil, peanut oil, soy oil, cotton oil, linseed oil or even wood oil. Epoxidized soy oil is particularly suitable for the production of the alkyd resins of the invention. In the event epoxidized triglycerides containing only a few epoxide groups, for example on average less than one epoxide group, per molecule are used for producing the alkyd resins, the resins obtained increasingly resemble conventional alkyd resins in their properties as their epoxide number decreases. Accordingly, it is preferred to use epoxidized triglycerides containing on average at least one and preferably more than one epoxide group per molecule, more particularly two or three epoxide groups per molecule.

In another embodiment, the present invention relates to alkyd resins containing as long-chain modifying components reaction products of epoxidized triglycerides which contain in the molecule epoxide groups and secondary hydroxyl groups formed by ring opening.

Partly ring-opened epoxidized triglycerides are suitable modifying agents. The triglycerides in question are epoxidized triglycerides such as those described above in which some of the epoxide groups have been reacted with monofunctional alcohols, particularly $C_1$-$C_3$ alcohols, to form β-hydroxyethers. In this case, a large number of alkyd resin starting materials is made available by appropriately selecting the epoxidized triglyceride and also the epoxidation and ring-opening conditions (conversions). Reaction products of epoxidized soy oil or linseed oil containing on average one to two epoxide groups and one to three secondary hydroxyl groups per molecule are particularly suitable. Products such as these are the subject of U.S. copending application Ser. No. 561,627 (Henkel Case D 6761), filed of even date herewith in favor of Alfred Meffert and Hermann Kluth, the disclosure of which is hereby specifically incorporated herein by reference. The process of that application is carried out by the partial ring-opening of epoxidized triglycerides of a fatty acid mixture containing at least partly olefinically unsaturated fatty acids with monohydric or polyhydric alcohols in the presence of a catalyst such as sulfuric acid at a temperature in the range of 50°–110° C. using a large excess, e.g. 2–10 molar excess, of the alcohol component, based on the epoxide groups, and then terminating the reaction when a conversion of from 20–80 mole percent of the epoxide groups takes place by either destruction or removal of the catalyst, and/or of the alcohol reactant.

To produce the alkyd resins according to the invention, the long-chain modifying components are condensed with standard alkyd resin starting materials by known methods. Standard alkyd resin starting materials are polybasic carboxylic acids and/or reactive derivatives thereof and polyhydroxy compounds, and, optionally, monofunctional modifying agents such as fatty acids. The polybasic carboxylic acids include aliphatic and aromatic dicarboxylic acids such as phthalic acid and isomers thereof, adipic acid, glutaric acid, succinic acid, maleic acid, fumaric acid, sebacic acid, etc., and tricarboxylic acids such as trimellitic acid. Reactive derivatives thereof include their anhydrides and esters, e.g. esters with lower alkanols. The polyhydroxy compounds include diols, such as ethylene glycol, propylene glycol, neopentyl glycol, etc. triols such as trimethylol ethane, trimethylol propane, glycerol, etc., and higher hydroxy compounds, such as pentaerythritol, sorbitol, etc.

The monofunctional modifying agents that can optionally be present in the alkyd resins of the invention include natural or synthetic fatty acids. However, it is also known that fatty alcohols or olefin oxides containing more than 8 carbon atoms can be used as monofunctional modifying agents. A detailed discussion of alkyd resins for water lacquers and monofunctional modifying agents that can be used therewith, which can also be used herein, may be found in the book entitled "Waterborne Coatings" by Charles R. Martens, Van Nostrand Reinhold Co., New York, 1981. Such monofunctional modifying agents can be present in the alkyd resin in an amount up to about 40% by weight, preferably up to about 20% by weight, and more preferably less than about 5% by weight, based on the weight of resin.

Catalysts are advantageously used to obtain better incorporation of the modifying agents in the resins. Suitable catalysts are, for example, p-toluene sulfonic acid or other acids, including inorganic acids such as sulfuric acid or phosphoric acid.

In the production of the alkyd resins, the long-chain alkyd resin modifying reaction component is always used in the presence of compounds containing carboxyl groups. In view of the higher reactivity of epoxide groups to carboxyl groups by comparison with hydroxyl groups, it is assumed that the epoxide groups react preferentially to form esters and not ethers during the condensation reaction.

Alkyd resins having different technical properties from those of known alkyd resins can be produced using the present long-chain modifying components. Thus, it may be desirable to control the condensation reaction in such a way that the resins formed have an acid number of <5 although their hydroxyl number is still in the range of from about 40 to about 200 mg of KOH/g. Resins such as these are suitable for use in solvent lacquers. They require a reactive component, such as for example a melamine resin or a resin containing isocyanate groups, for hardening.

In addition, the condensation reaction may be carried out in such a way that the resins formed have an acid number of from about 30 to about 80 and an —OH number of from about 40 to about 200 mg of KOH/g. After neutralization with amines, resins such as these are suitable for the production of stoving water lacquers.

In one particularly preferred embodiment of the invention, the condensation reaction is carried out in such a way that the resins formed have an acid number of from about 5 to about 30 and preferably from about 15 to about 25 and a hydroxyl number of >200 and preferably >250 mg of KOH/g. Resins such as these are suitable for the production of special environmentally safe water lacquers. They are distinguished by the fact that they can be made up into water lacquers without the assistance of amines, volatile auxiliary solvents or emulsifiers of the type which are not affected by stoving.

The general processes for producing alkyd resins having the above characteristics are described in the Encyclopedia of Polymer Science and Technology (1964), volume 1, page 687 et seq.. A very useful method for use herein is the fatty acid method described on page 688. In order to obtain alkyd resins having an acid number of less than 5 and a hydroxyl number in the range of from about 40 to about 200 mg. of KOH/g, the esterification reaction is carried out in either a single step or in multiple steps until essentially all of the carboxyl groups have been esterified, i.e. the acid number is less than 5. Alkyd resins having an acid number of from about 30 to about 80 and a hydroxyl number of from about 40 to about 200 mg. of KOH/g can be produced using the same process except that the esterification process is terminated when there are still unesterified carboxyl groups present. Similarly, in order to obtain alkyd resins having an acid number of from about 5 to about 30 and a hydroxyl number of greater than 200, the esterification process is terminated when the acid number is in the stated range. The proportions of reactants used to form the above alkyd resins are adjusted so that the desired hydroxyl numbers are obtained.

Neutralization is preferably carried out with amino-alcohols containing several hydroxyl groups which can be incorporated in the lacquer film during condensation in the quantities used for neutralizing such low acid numbers without any adverse effect upon the technical properties of the lacquer.

Particularly preferred alkyd resins can be produced by condensing polyhydroxy compounds, such as ethylene glycol, propylene glycol, trimethylol propane, glycerol, pentaerythritol or sorbitol in a first stage with dicarboxylic acids, such as adipic acid, sebacic acid and/or phthalic acid or reactive derivatives thereof, optionally with fatty acids or with even higher polycarboxylic acids, such as trimellitic acid or its anhydride, and the epoxide reaction component at reaction temperatures around 200° C. and optionally in the presence of strong acids as catalysts until the acid number is around 5 or lower. In a second stage, the condensation product obtained is acidified with a dicarboxylic acid or its anhydride, for example with phthalic anhydride, and further condensed at elevated temperatures, i.e. at temperatures above 200° C., until the acid number is in the range of from about 40 to about 120 and preferably in the range of from about 60 to about 100. In a third stage, 2,3-dihydroxypropyl groups are introduced by the addition of glycidol. Glycidol is introduced until the acid number is in the range from about 5 to about 30 and preferably in the range of from about 15 to about 25 mg of KOH/g.

The resins thus produced have an —OH number of >200 and preferably >250. They are suitable for the production of particularly environmentally safe water lacquers, for which purpose they may be dissolved in water, optionally with emulsifiers of the type which are not affected by stoving, followed by the addition of crosslinking agents, for example melamine resins. The water lacquers thus produced are optically clear and indistinguishable in appearance from solutions. On stoving, they give off hardly any volatile components capable of polluting the environment. So far as their technical properties are concerned, they are distinguished by particularly outstanding weathering properties, high resistance to condensed moisture and high flexibility combined with extreme hardness. Thus, Konig pendulum hardness values (DIN 53 157) of >100 secs. are reached for Erichsen indentation values of >5.0 mm.

The alkyd resins according to the invention can be made up into water lacquers or even into solvent lacquers, preferably those in which from about 20 to about 60% by weight, based on the weight of lacquers, of the alkyd resins of the invention are present. These lacquers can be pigmented by conventional methods. As lacquer binders, combinations of the alkyd resins according to the invention with amino resin formers, such as hexamethyl ethers of hexamethylol melamine or the corresponding condensates, have particularly favorable properties. The lacquer films obtained by applying the solutions in a known manner are stoved, preferably after preliminary drying, at temperatures of from about 120° to about 180° C. in suitable drying ovens or drying tunnels.

The lacquers can be used for coating a variety of different materials, such as glass or metals, for example aluminum, iron, steel and the like.

The invention will be better understood from the following examples, which are given for illustration purposes only and not to limit the invention.

EXAMPLES

The following components are condensed in a standard reaction vessel:
- 200 g of trimethylol propane
- 220 g of neopentyl glycol
- 200 g of adipic acid
- 120 g of epoxide Water of condensation was removed by passing nitrogen through the reaction mixture. Approximately 44 ml of water was split off; the acid number was <5; the reaction temperature 180°–220° C.; the reaction time 2 hours. The condensate formed was then reacted with 400 g of phthalic acid anhydride and condensation continued for 2 hours at 220° C. Approximately 27 ml of water split off; the acid number was 70–80. 32 g. of the adduct of 2 moles of glycidol with 1 mole of 2-methyl-2-aminopropanol and 65 g of glycidol were then added at a temperature of approximately 150° C. An acid number of approximately 25 and an —OH number of >200 mg of KOH/g were reached after 1 hour at a reaction temperature of 130° C. The following components were then added to the above product to obtain a pourable 85% resin solution: approximately 63 g of the adduct of 7.5 moles of glycidol with nonyl phenol, approximately 122 g of the adduct of 2 moles of glycidol with 2-methyl-2-aminopropanol and approximately 235 g of deionized water.

Epoxides used:

EXAMPLE 1

Epoxidized technical oleyl alcohol, starting iodine number 92–96 mg I/g; 4.5–4.8% by weight of epoxide oxygen, iodine number 2–5.

EXAMPLE 2

Epoxidized technical oleyl alcohol, starting iodine number 110–130, 4.7–5.2% by weight of epoxide oxygen, iodine number 9–11.

EXAMPLE 3

Epoxidized erucic alcohol, starting iodine number 80–85, 3.8–4.2% by weight of epoxide oxygen, iodine number 2–5.

EXAMPLE 4

Epoxidized soy triglyceride partly opened with methanol. Starting iodine number 120–141. Epoxide number before ring opening: 6.1–6.3 Epoxide number after ring opening: 3.1–3.3 (% by weight of epoxide oxygen).

COMPARISON EXAMPLE

An alkyd resin free from fatty acids was produced in accordance with Example 2 of German patent application DE No. 28 15 096. To this end, the following components were condensed in a standard apparatus for 4 hours at 160° to 220° C. while nitrogen was passed through:
- 200 g of $C_{12}/C_{14}$-1,2-epoxy alkane
- 296 g of phthalic acid anhydride
- 146 g of adipic acid
- 208 g of neopentyl glycol
- 134 g of trimethylol propane 70 ml of water of reaction were split off. The acid number was <1.5. The condensate was then reacted with 148 g of phthalic acid anhydride for 1 hour at 150° C., followed by condensation up to an acid number of 59.0.

982 g of resin were obtained and made up with 221 g of butyl glycol, 221 g of butanol, 104 g of triethylamine and 443 g of water into a 50% solvent-containing resin solution.

PRODUCTION OF COATINGS (WHITE LACQUER)

A ground paste was prepared in a dissolver from (parts by weight)
- 50 parts of alkyd resin, 85% in water
- 32 parts of deionized water
- 30 parts of pigmenting aids (9 parts of a 30%, acid-group-containing low molecular weight acrylate dispersion—PRIMAL I 94, a product of the Rohm & Haas Co.—and 1 part of 2-methyl-2-aminopropanol-2-glycidol, 75% by weight in water)
- 183 parts of titanium dioxide (CHRONOS TITAN CL 310)

A lacquer was made up with the above paste and
- 309 parts of alkyd resin, 85% in water
- 131 parts of melamine resin (CYMEL 301, a product of American Cyanamid Co.)
- 265 parts of deionized water.

1000 parts of a white lacquer having an alkyd resin to melamine resin ratio of 7:3 and a pigment volume concentration of approximately 11% were obtained.

The resin solution of the Comparison Example was also made up into a corresponding lacquer.

To test the films, the lacquers were sprayed onto steel plates and stoved for 15 minutes at 160° C. The dry films were between 25 and 40 μm thick. The results obtained are listed in the following Table.

TABLE

| | Stoving conditions: 15 minutes at 160° C. | | | | |
|---|---|---|---|---|---|
| Example No. | Konig pendulum hardness | Erichsen indentation | % gloss at 20° | % gloss after 600 h WOM test*** | "Sweatbox" 40° C. hours bubble-free |
| 1 | 188 | 5.4 | 83 | 77 | 120 |
| 2 | 187 | 5.4 | 86 | 76 | 120 |
| 3 | 108 | 9.2 | 88 | 79 | 216 |
| 4 | 148 | 6.9 | 83 | 75 | 96 |
| V1* | 28 | 10 | 78 | 73 | 48 |
| V2** | 61 | 10 | 60 | 56 | 72 |

*Comparison Example
**Lacquer V1 stoved for 30 mins. at 160° C.
***Weather-O-Meter Test

What is claimed is:

1. An alkyd resin which contains the reaction product of (a) at least one polybasic carboxylic acid or reactive derivative thereof;
(b) at least one polyhydroxy compound;
(c) at least one epoxide selected from the group consisting of
   (i) an epoxidized unsaturated fatty alcohol containing from 16 to 22 carbon atoms,
   (ii) an ester of an epoxidized fatty acid and a monofunctional alcohol containing from 1 to 18 C-atoms,
   (iii) an epoxidized triglyceride, and
   (iv) a reaction product of an epoxidized triglyceride containing in the molecule epoxide groups and secondary hydroxyl groups formed by ring opening; and, optionally,
(d) at least one monofunctional modifying agent.

2. Am alkyd resin in accordance with claim 1 wherein the monofunctional modifying agent (d) is a fatty acid present in a quantity up to 40% by weight, based on the weight of the alkyl resin.

3. An alkyd resin in accordance with claim 1 wherein said resin has an —OH number of from about 40 to about 200 mg of KOH/g of resin and an acid number of from about 30 to about 80.

4. An alkyd resin in accordance with claim 1 wherein said resin has an —OH number of >200 mg of KOH/g of resin and an acid number of from about 5 to about 30.

5. An alkyd resin in accordance with claim 4 wherein said acid number is from about 15 to about 25.

6. An alkyd resin in accordance with claim 4 wherein said resin is the further reaction product with glycidol.

7. An alkyd resin in accordance with claim 1 wherein said resin has a —OH number of from about 40 to about 200 mg of KOH/g of resin and an acid number of <5.

8. An alkyd resin in accordance with claim 1 wherein component (c) is present in from about 5 to about 50% by weight, based on the weight of the alkyd resin.

9. An alkyd resin in accordance with claim 8 wherein from about 10 to about 30% by weight is present.

10. A stoving lacquer comprising the alkyd resin of claim 1 with stoving lacquer excipients.

11. A water stoving lacquer comprising the alkyd resin of claim 4 with stoving lacquer excipients.

12. A water stoving lacquer comprising the alkyd resin of claim 5 with stoving lacquer excipients.

13. A water stoving lacquer comprising the alkyd resin of claim 6 with stoving lacquer excipients.

* * * * *